(12) United States Patent
Mortensen et al.

(10) Patent No.: US 8,328,241 B1
(45) Date of Patent: Dec. 11, 2012

(54) CLAMPLESS FITTING FOR PLASTIC PIPES

(75) Inventors: Mark A. Mortensen, Wheat Ridge, CO (US); Rodney G. May, Arvada, CO (US)

(73) Assignee: Duane D. Robertson, Golden, CO (US)

( * ) Notice: Subject to any disclaimer, the term of this patent is extended or adjusted under 35 U.S.C. 154(b) by 6 days.

(21) Appl. No.: 13/192,015

(22) Filed: Jul. 27, 2011

(51) Int. Cl.
 *F16L 33/00* (2006.01)
(52) U.S. Cl. ........................ 285/239; 285/259
(58) Field of Classification Search ............... 285/259, 285/258, 338, 346, 239, 238, 345, 242, 347, 285/351
 See application file for complete search history.

(56) References Cited

U.S. PATENT DOCUMENTS

| | | | | |
|---|---|---|---|---|
| 216,851 | A | * | 6/1879 | Hfmann ................. 285/238 |
| 531,578 | A | | 12/1894 | Van Dyke |
| 589,216 | A | * | 8/1897 | McKee .................. 285/239 |
| 651,134 | A | * | 6/1900 | Dickens ................. 285/38 |
| 1,228,549 | A | | 6/1917 | Furduy |
| 1,723,273 | A | | 8/1929 | Erwin |
| 1,994,784 | A | | 3/1935 | Porzel |
| 1,996,855 | A | | 4/1935 | Cheswright |
| 2,452,277 | A | | 10/1948 | Woodling |
| 3,214,200 | A | | 10/1965 | Carlson et al. |
| 3,262,721 | A | | 7/1966 | Knight |
| 3,494,639 | A | | 2/1970 | Smith |
| 3,563,575 | A | | 2/1971 | Sanford |
| 3,762,565 | A | | 10/1973 | Okuniewski et al. |
| 3,773,360 | A | * | 11/1973 | Timbers ................. 285/307 |
| 3,876,233 | A | | 4/1975 | Schmedding et al. |
| 3,993,334 | A | | 11/1976 | Fridman et al. |
| 4,006,923 | A | | 2/1977 | Wagner |
| 4,040,651 | A | | 8/1977 | LaBranche |
| 4,105,226 | A | * | 8/1978 | Frey et al. ............... 285/148.21 |
| 4,138,145 | A | | 2/1979 | Lawrence |
| 4,138,146 | A | | 2/1979 | Rumble |
| 4,313,628 | A | | 2/1982 | Duenke |
| 4,521,037 | A | | 6/1985 | Knox |
| 4,583,767 | A | | 4/1986 | Hansen |
| 4,603,890 | A | | 8/1986 | Huppee |
| 4,610,468 | A | * | 9/1986 | Wood ...................... 285/81 |
| 4,750,764 | A | | 6/1988 | Gibellina |

(Continued)

*Primary Examiner* — Aaron Dunwoody
(74) *Attorney, Agent, or Firm* — W. Scott Carson

(57) ABSTRACT

A clampless fitting for one or more plastic pipes. The fitting has at least one section extending along an axis with a sealing portion and pipe gripping portion adjacent one another on the outer surface of the section. The pipe gripping portion includes a recess extending about the axis of the fitting section with a pipe gripping ring removably received in it and extending substantially about the axis. The ring is substantially C-shaped about the axis and has a plurality of pairs of first and second end segments spaced from each other along the axis and respectively joined by a central pivot segment. In operation, the fitting section is inserted in a first direction into the open end of the plastic pipe to a first location relative to the pipe in which both the sealing and pipe gripping portions are received in the pipe. The second end segment of the ring has a pipe piercing, tip section that is supported above the inner surface of the pipe as the pipe passes over the fitting section to the first relative location. Movement of the fitting section and pipe in an opposite direction away from each other will then cause the upstanding tip sections of the second end segments to pierce the inner surface of the pipe and move into the pipe wall and pivot the first and second end segments of the ring to abut one another to secure the fitting section and pipe in place.

20 Claims, 6 Drawing Sheets

U.S. PATENT DOCUMENTS

| Patent No. | | Date | Inventor | Ref. |
|---|---|---|---|---|
| 4,798,404 | A | 1/1989 | Iyanicki | |
| 4,934,745 | A | 6/1990 | Healy | |
| 5,017,182 | A | 5/1991 | Mabie | |
| 5,024,469 | A | 6/1991 | Aitken et al. | |
| 5,259,650 | A * | 11/1993 | Gnauert et al. | 285/39 |
| 5,487,571 | A | 1/1996 | Robertson | |
| 5,524,939 | A | 6/1996 | Bartholomew | |
| 5,582,436 | A | 12/1996 | Bartholomew | |
| 5,624,139 | A | 4/1997 | Van Kooten | |
| 5,851,036 | A | 12/1998 | Vanesky | |
| 5,853,203 | A | 12/1998 | Crandall | |
| 5,868,435 | A | 2/1999 | Bartholomew | |
| 5,921,592 | A * | 7/1999 | Donnelly | 285/340 |
| 5,927,411 | A | 7/1999 | Sheirer | |
| 6,158,784 | A | 12/2000 | Lavender | |
| 6,695,355 | B1 | 2/2004 | Giuffre | |
| 6,769,721 | B2 | 8/2004 | Fuest | |
| 6,773,039 | B2 * | 8/2004 | Muenster et al. | 285/259 |
| 6,974,162 | B2 | 12/2005 | Chelchowski et al. | |
| 7,163,238 | B1 | 1/2007 | Mittersteiner et al. | |
| 7,396,060 | B2 | 7/2008 | Huncovsky | |
| 7,404,581 | B2 * | 7/2008 | Baving et al. | 285/242 |
| 7,510,623 | B2 | 3/2009 | Lutz et al. | |
| 7,566,076 | B2 | 7/2009 | Bryan | |
| 2003/0230895 | A1 | 12/2003 | Brown | |

* cited by examiner

CLAMPLESS FITTING FOR PLASTIC PIPES

BACKGROUND OF THE INVENTION

1. Field of the Invention

This invention relates to the field of fittings for plastic pipes such as used in lawn irrigation systems and more particularly to the field of clampless fittings for such pipes.

2. Discussion of the Background.

Fittings for plastic pipes such as used in lawn irrigation systems are commonly secured to the pipes in any number of manners. However, the fittings are generally either positioned outside the open end of the pipe or received within the open end of the pipe.

Fittings that are designed to be positioned outside or over the pipe (i.e., the open end of the pipe is receive in the fitting) have several disadvantages. First, the outer diameter of such plastic pipes varies widely in the industry from manufacturer to manufacture even though the inner diameter may be standard and the same. Such fittings must then be able to accommodate pipes of different, outer diameters and different wall thicknesses. In many cases, such fittings must be specifically designed and may only fit or fit well with certain pipes made by certain manufacturers. The initial installer or repairer may then need to carry or have available a number of different fittings depending upon the pipes at the site. A second disadvantage of such fittings designed to be positioned over or outside the pipe is that the exterior of the pipe adjacent its open end invariably must be manually cleaned and cleared of all dirt and debris before insertion into the fitting otherwise the seal may leak. This may be difficult to do depending upon the conditions at the site (e.g., weather, cramped quarters of the hole, or time limitations) and may even be intentionally or unintentionally skipped by the installer. Further, due to these and other disadvantages, many exterior fittings often have fairly complicated and involved designs both to use and to manufacture and in many cases may require a number of parts including some that may need to extend into the pipe interior.

As mentioned above and unlike the outer diameter of such plastic pipes, the inner diameter for any particular gauge is essentially standard in the industry from manufacturer to manufacturer. Consequently, fittings designed to be received or inserted into the pipe versus over or outside the pipe can be designed to work with any pipe of a certain gauge regardless of the manufacturer. The cleaning step is also often not necessary as the exterior of the fitting and the inside of the pipe are usually relatively free of dirt and debris.

However, one common disadvantage of such fittings designed to be received in the open end of the pipe with the pipe then extending about the fitting is the need to use exterior clamps with them to securely hold and seal the pipe onto the fitting. This in turn requires the initial installer or repairer to carry and attach clamps at each connection. In the field, this can become burdensome and time consuming and the clamps may become lost or forgotten or an insufficient number of them may have been brought to the site. Clampless fittings or ones that can seal and hold themselves in the pipe without the need of an exterior clamp are most desirable but presently available ones often do not reliably operate in the field under all conditions.

With this and other problems in mind, the present invention was developed. In it, a clampless fitting is provided which can be inserted into the open end of a plastic pipe and will grip and reliably secure itself in place as the pipe and fitting are initially moved apart either manually or under the pressure of the water in the pipe. Additionally, the fitting will continue to remain in place and seal under normal operating conditions as the water in the pipe is cycled on and off alternately loading and unloading the pipe.

SUMMARY OF THE INVENTION

This invention involves a clampless fitting for one or more plastic pipes. The fitting has at least one section extending along an axis with a sealing portion and pipe gripping portion adjacent one another on the outer surface of the section. The pipe gripping portion includes a recess extending about the axis of the fitting section with a pipe gripping ring removably received in it and extending substantially about the axis. The ring is substantially C-shaped about the axis and has a plurality of pairs of first and second end segments spaced from each other along the axis and respectively joined by a central pivot segment. In the preferred embodiment, one wall of the recess has an inclined surface and the second end segment of the ring has a matching, inclined surface.

In operation, the fitting section is inserted in a first direction into the open end of the plastic pipe to a first location relative to the pipe in which both the sealing and pipe gripping portions are received in the pipe. The diameter of the outer surface of the fitting section and inner surface of the pipe are substantially the same and as the fitting is inserted into the pipe, the inner surface of the pipe tightly presses the C-shaped ring into the recess of the fitting section. In doing so, the inclined surface of the second end segment of the ring preferably abuts the inclined surface of the wall of the recess. The second end segment of the ring has a pipe piercing, tip section that is supported above the inner surface of the pipe as the pipe passes over the fitting section to the first relative location. The pipe and particularly its inner surface are stretched diametrically and tensioned over the upstanding, tip sections of the second end segments of the ring. Movement of the fitting section and pipe in an opposite direction away from each other will then cause the upstanding tip sections of the second end segments to pierce the inner surface of the pipe and move into the pipe wall. Continued movement of the fitting section and pipe apart (e.g., either manually or under the pressure of the water) will pivot the second end segments of the ring about the central segments thereof until the second end segments respectively abut the first end segments. Any further movement of the fitting section and pipe apart is then halted to securely hold the fitting section and pipe in place.

DETAILED DESCRIPTION OF THE INVENTION

Figure 1:
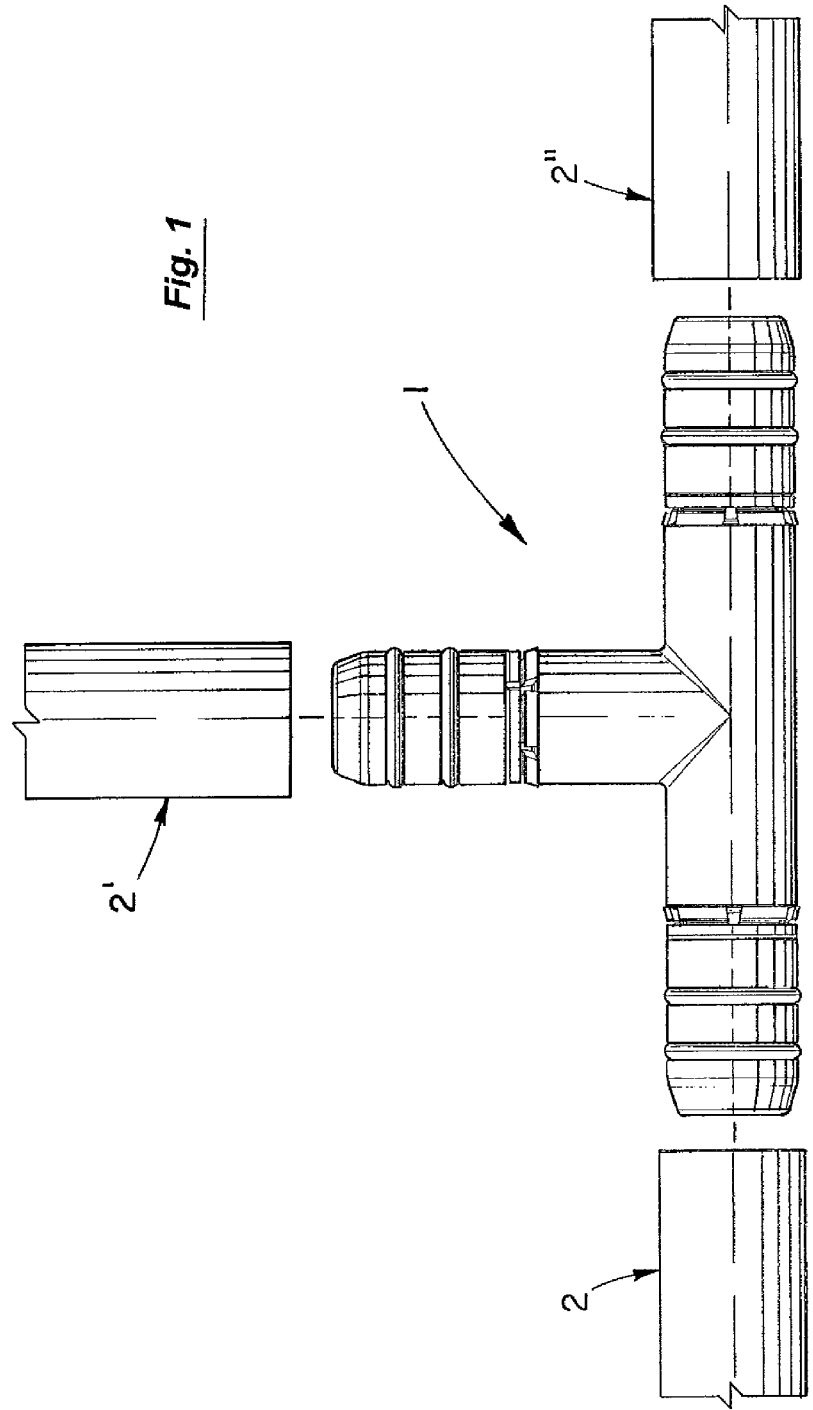
FIG. 1 illustrates the fitting of the present invention in the configuration of a Tee for use with multiple plastic pipes.
Figure 2:
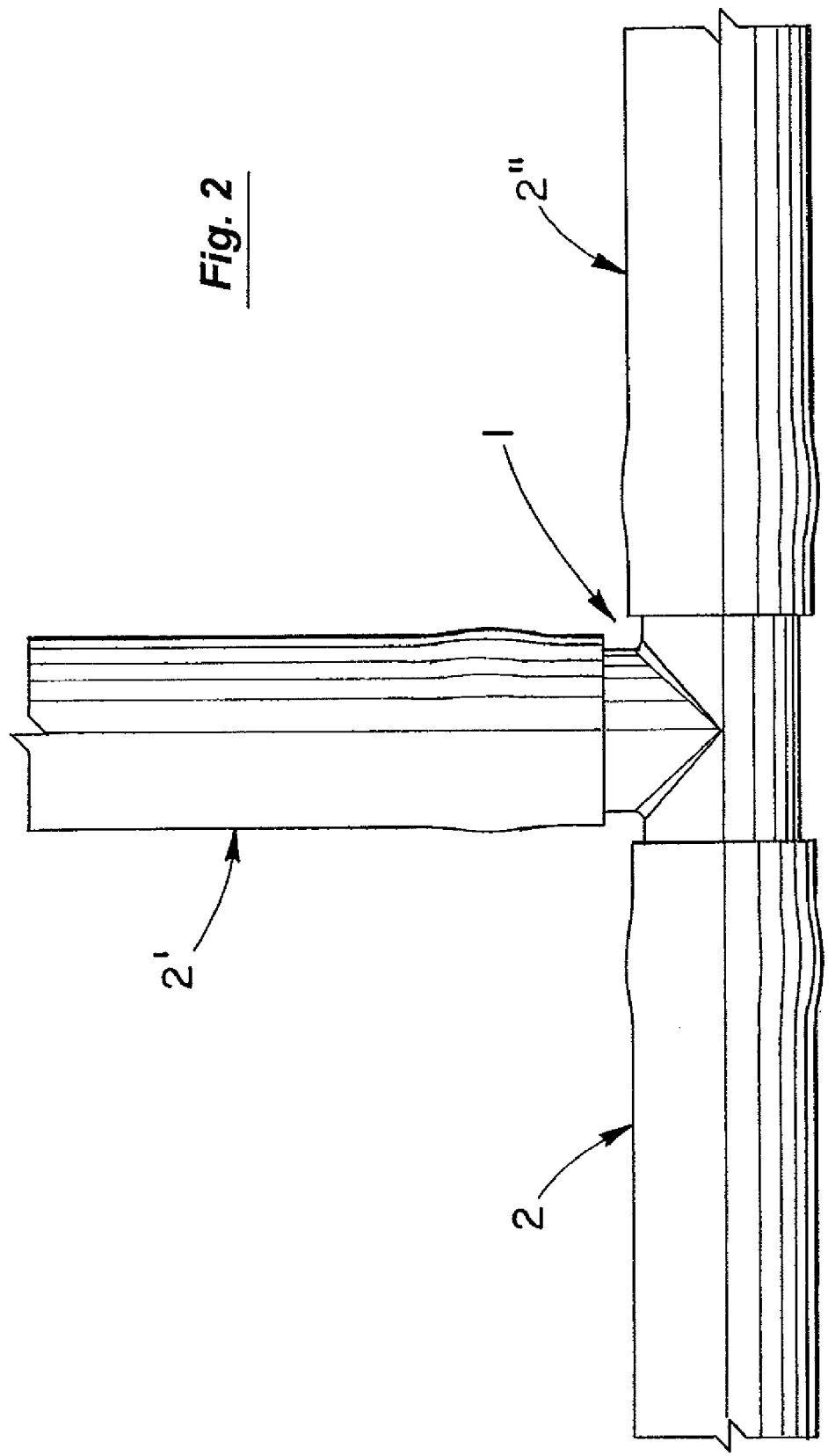
FIG. 2 is a view of the fitting and pipes of FIG. 1 assembled for use.

As shown in FIGS. 1-2, the fitting 1 of the present invention can be used with one or more plastic pipes 2, 2', and 2". Each plastic pipe (e.g., polyethylene) is substantially cylindrical about a first axis 4 as illustrated in reference to pipe 2 in FIGS. 3-4 and has a wall 6 (e.g., 0.010 inches thick) extending along the first axis 4 between outer and inner surfaces 8,10. Each plastic pipe as shown in FIGS. 3-4 (e.g., see plastic pipe 2) has at least one open end 12.

Figure 3:
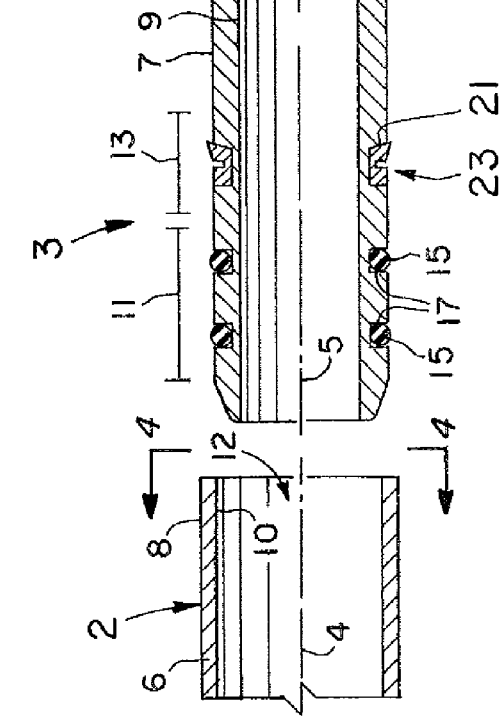
FIG. 3 is a cross-sectional view of the fitting and pipes of FIG. 1.
Figure 4:
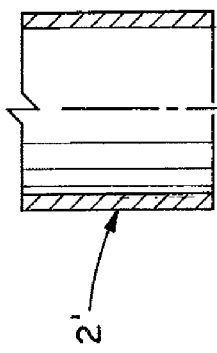
FIG. 4 is a view taken along line 4-4 of FIG. 3 of one of the cylindrical, plastic pipes.

The fitting 1 (e.g., polyvinylchloride or PVC) includes at least one, substantially cylindrical section 3 extending along and about a second axis 5 (FIG. 3). The one section 3 as seen in FIG. 3 has inner and outer surfaces 7,9. The outer surface 7 in turn has a sealing portion 11 and a pipe griping portion 13 adjacent one another along the second axis 5. The sealing portion 11 has one or more, flexible O-rings 15 (e.g., elastomeric) in one or more grooves 17 that extend about the axis 5. The pipe gripping portion 13 (see FIGS. 3 and 5) includes a recess 21 extending substantially about the second axis 5 and a pipe gripping ring 23 received in the recess 21 that also extends substantially about the second axis 5.

The recess 21 in the illustrated section 3 of the fitting 1 has a substantially U-shaped cross section (FIG. 6) defined by first and second walls 25,27 and a base 29 extending therebetween. The first and second walls 25, 27 as shown are spaced from each other along the second axis 5 (FIG. 6) and extend outwardly from the base 29 of the recess 21 and the second axis 5. The surface of the second wall 27 is inclined away from the first wall 25 and base 29 at a first obtuse angle A (105-110 degrees) to the second axis 5 (FIG. 6).

Figures 5, 6, 7:
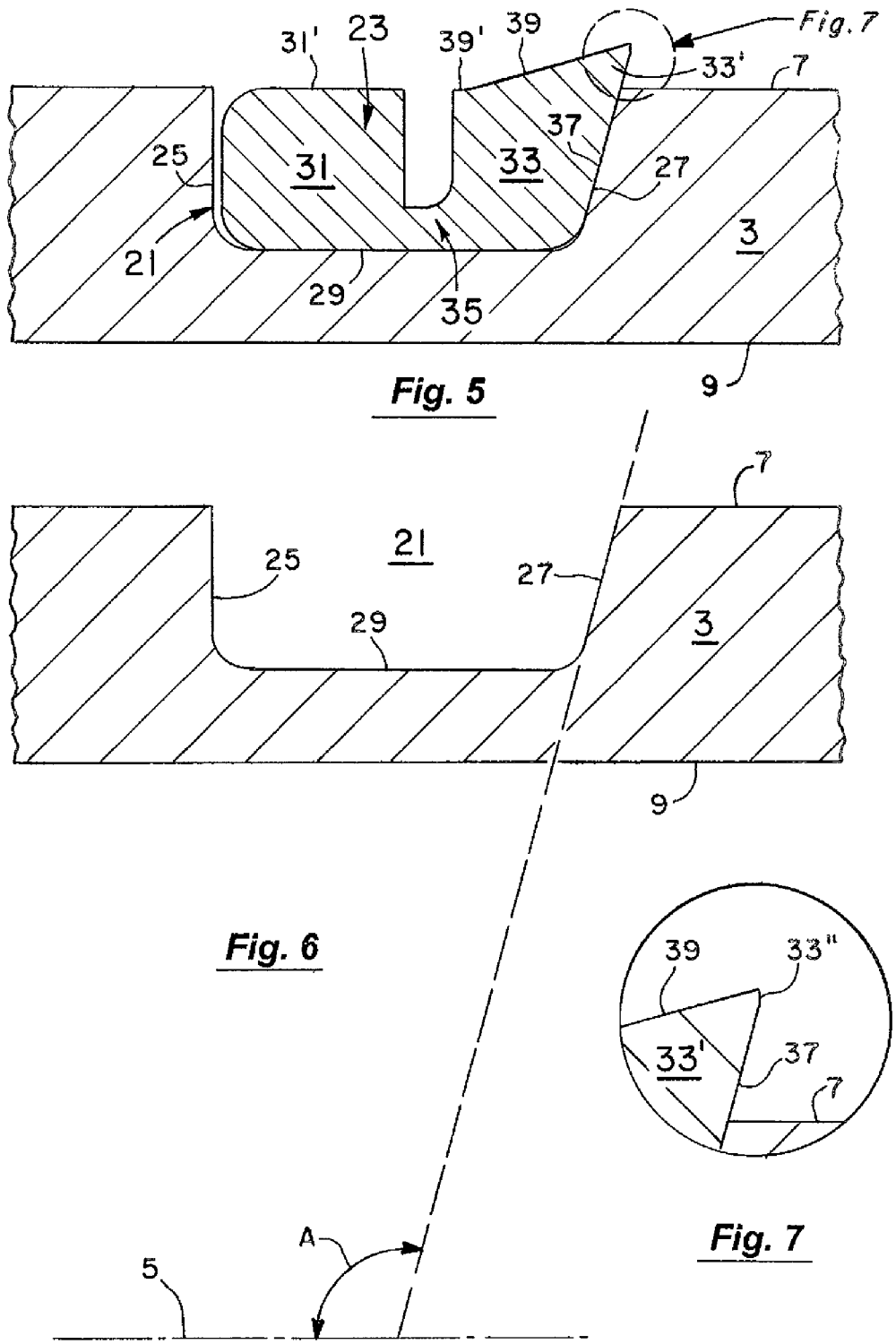
FIG. 5 is an enlarged view of the pipe gripping portion on one of the sections of the fitting showing the recess and pipe gripping ring positioned in it.
FIG. 6 further illustrates the details of the recess.
FIG. 7 is an enlarged view of the pipe piercing, tip section of the pipe gripping ring of FIG. 5.

The pipe gripping ring 23 received in the recess 21 as illustrated in FIG. 5 has first and second end segments 31,33 and a central pivot segment 35 joining and pivotally mounting the first and second end segments 31,33 to each other. The first end segment 31 is positioned in the recess 21 adjacent the first recess wall 25 and the second end segment 33 of the pipe gripping ring 23 is positioned adjacent the second recess wall 27. The second end segment 33 as positioned in the recess 21 in FIG. 5 has an outer surface 37 inclined away from the base 29 of the recess 21 and the second axis at a second obtuse angle (e.g., 105-110 degrees) to the second axis 5.

The second end segment 33 of the pipe gripping ring 23 as positioned in the recess 21 in FIG. 5 has a pipe piercing, tip or barb section 33' extending outwardly of the second axis 5 beyond the outer surface 7 of the section 3 of the fitting 1 (see also FIG. 7). The tip section 33' is formed between the inclined surface 37 of the second end segment 33 and a top or outer surface portion 39 of the second end segment 33 which extends along the second axis 5. The very end of the tip section 33' at 33" (see FIG. 7) is preferably truncated for more strength in piercing the plastic pipe 2 as explained in more detail below.

Figure 8:
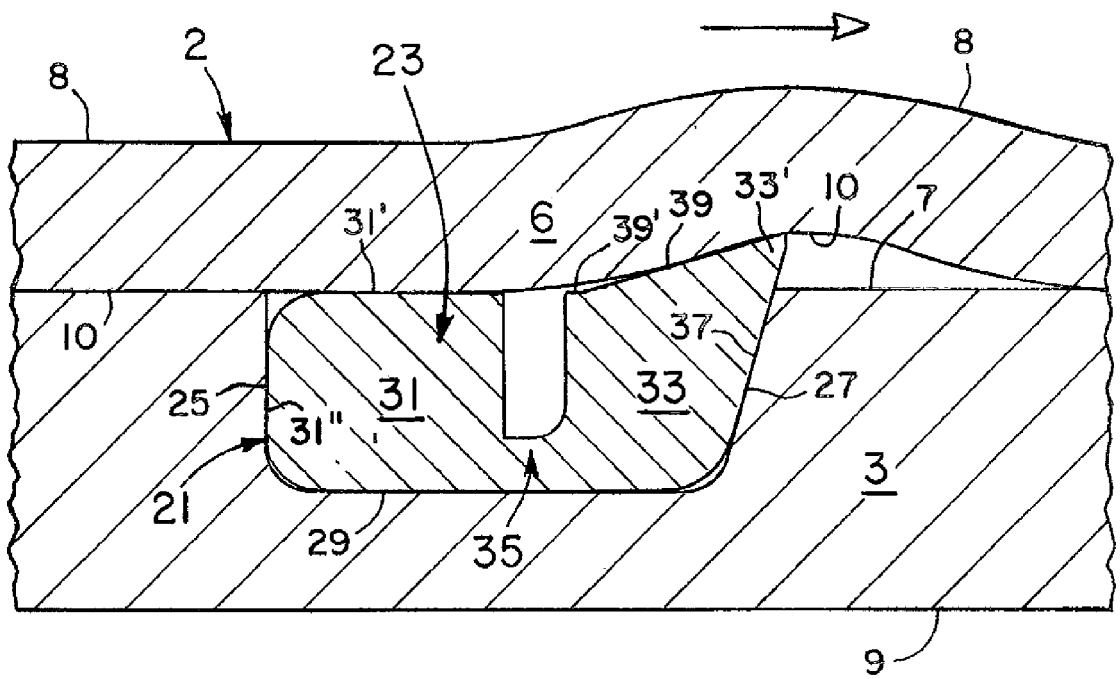
FIGS. 8 and 9 sequentially show the operation of the pipe gripping ring as the fitting section and pipe are first moved toward each other to insert the fitting section into the pipe (FIG. 8) and then moved apart either manually or under the load of the water pressure to drive the tip section of the ring into the pipe wall to grip and hold the fitting section and pipe in place (FIG. 9).

In operation, the plastic pipe 2 on the left side of FIG. 3 and the section 3 of the fitting 1 in FIG. 3 are manually moved toward each other. The sealing and pipe griping portions 11,13 of the section 3 are receivable in the plastic pipe 2 through the open end 12 of the plastic pipe 2. The plastic pipe 2 and section 3 are then moved toward each other to a first location relative to each other (FIG. 8). During this movement, the inner surface 10 of the plastic pipe 2 initially contacts and slides along the top surface 31' of the first end segment 31 of the pipe gripping ring 23 and along the top surface portion 39' of the second end segment 33 of the pipe gripping ring 23. The inner surface 10 of the plastic pipe 2 then rides up and over the slightly inclined (e.g., 15-20 degrees), top surface portion 39 of the second end segment 33 to the position of FIG. 8. At this point, the plastic pipe 2 slightly flexes its inner surface 10 away from the surface portion 39' as shown in FIG. 8. The top surface 31' of the first end segment 31 and top surface portion 39' of the second end segment 33 in this regard are preferably aligned (FIG. 5); and, as the plastic pipe 2 is moved over the inclined top surface portion 39 of the second end segment 33 to the position of FIG. 8, the plastic pipe 2 is slightly stretched diametrically and tensioned. This will draw or move the pipe gripping ring 23 tightly into the recess 21. In doing so, the left side surface 31" of the first end segment 31 in FIG. 8 will tightly abut the first wall 25 of the recess 21 and the inclined surface 37 of the second end segment 33 will tightly abut the inclined surface of the second wall 27 of the recess 21. The upstanding, tip section 33' of the second end segment 33 of the pipe gripping ring 23 (FIG. 8) is then tightly pressed against the inner surface 10 of the diametrically stretched or tensioned plastic pipe 2. The pipe gripping ring 23 is also tightly held in the recess 21 in the position of FIG. 8 with the first and second end segments 31,33 spaced from each other about the central pivot segment 35 as shown.

Figure 9:
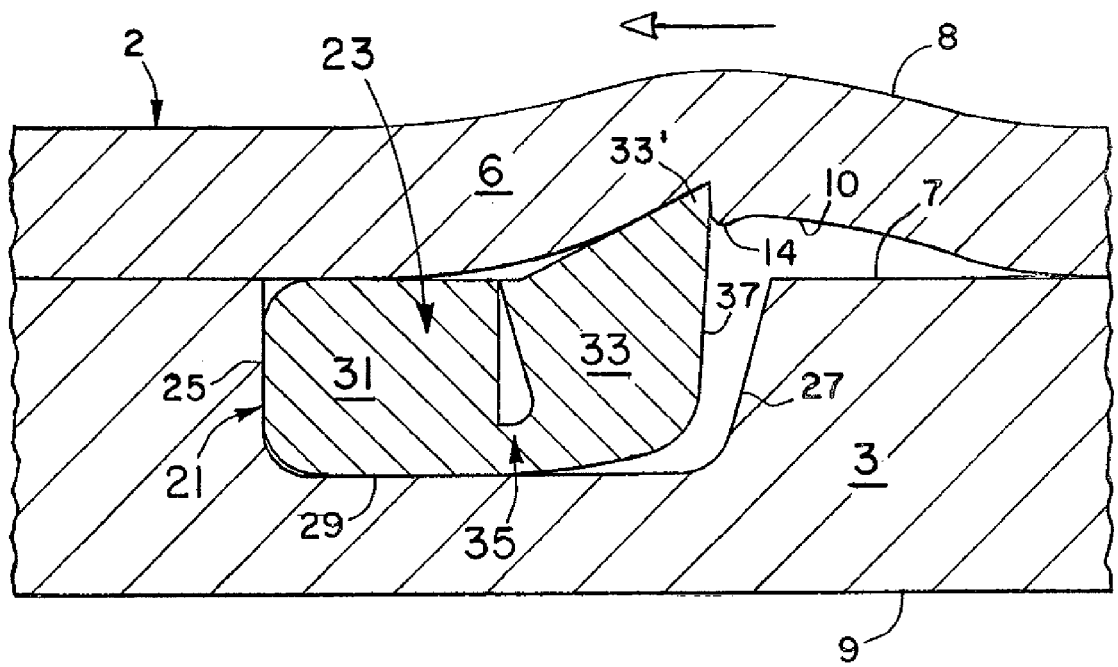

As the plastic pipe 2 and section 3 of the fitting 1 are then moved away from each other in a direction opposite to the insertion direction (e.g., either pulled apart manually or under the pressure load of the water in the plastic pipe 2), the upstanding tip section 33' of the second end segment 33 will pierce the inner surface 10 of the plastic pipe 2. The piercing tip section 33' will continue to move into the pipe wall 6 until the second end segment 33 pivots about the central segment 35 of the pipe gripping ring 23 to abut the first end segment 31 as in FIG. 9. At this second, relative location of section 3 of the fitting 1 and the plastic pipe 2 illustrated in FIG. 9, the tip section 33' has pierced into the pipe wall 6 (e.g., 0.025 to 0.040 inches of the 0.110 inch thickness of the pipe wall 6) and the relative movement of the plastic pipe 2 and section 3 will be halted. With the first and second end segments 31,33 in this predetermined, second and abutting position of FIG. 9, the surface 37 of the second end segment 33 has been pivoted about the central pivot segment 35 (i.e., counterclockwise in FIG. 9) and is preferably just short of being vertical (e.g., by less than 10 degrees and preferably less than 5 degrees)) Stated another way, the surface 37 at this position of FIG. 9 extends toward the second wall 27 of the recess 21 forming an angle of slightly less than 90 degrees with the second axis 5. This is preferred as at vertical or beyond more than 90 degrees about the central pivot segment 35 as measured relative to the axis 5, the tip section 33' tends to lose its leverage and grip on the plastic pipe 2 and the pipe 2 may move or continue to slide to the left beyond the location of FIG. 9. It is noted as illustrated in FIG. 9 that the pipe piercing, tip section 33' tends to displace or elastically deform the inner pipe wall 10 creating a burr at 14. This burr 14 aids the tip section 33' and second end section 33 to hold the plastic pipe 2 in the position of FIG. 9 relative to the section 3 by creating more surface area contact between the inclined surface 37 and the pierced portion of the pipe 2. The additional surface area of the burr 14 also helps the tip section 33' to stay in or at least stay aligned with the mating deformation in the pipe wall 6 as the section 3 and pipe 2 may be moved laterally relative to each other when the water of the system is cycled on and off to load and unload pressure in the pipe 2.

The pipe gripping ring 23 as previously discussed is pushed into the recess 21 from the position of FIG. 5 to the position of FIG. 8 by the plastic pipe 2 being moved onto the section 3 passed the pipe gripping ring 23. The first and second end segments 31,33 of the pipe gripping ring 23 then respectively abut the first and second walls 25,27 of the recess 21. This occurs because the plastic, pipe gripping ring 23 (e.g., acetal) is substantially C-shaped (see FIGS. 10-11). Consequently, the pipe gripping ring 23 as initially placed in the recess 21 by spreading open the C-shape and letting the opened ring 23 snap into place may fit somewhat loosely in the recess 21 in the position of FIG. 5 and be rotatable about the recess 21.

However, as the plastic pipe 2 passes over the pipe gripping ring 23 to the position of FIG. 8, the free ends 23' of the C-shape (FIG. 11) will move toward each other tending to close the C and the pipe gripping ring 23 will be moved tightly into the recess 21 to the position of FIG. 8. In this position of FIG. 8 as also discussed above, the inclined surface 37 of the second end segment 33 abuts the mating, inclined surface of the second wall 27 of the recess 21.

The inclined surface of the second wall 27 of the recess then provides a stop against any farther movement of the second end segment 33 away from the first end segment 31 (i.e., clockwise about the central pivot segment 35 in FIG. 8). This in turn allows the pipe piercing, tip section 33' of the second end segment 33 to assume the upstanding desired position of FIG. 8 protruding above the outer surface 7 of the section 3 of the fitting 1. The tip sections 33' are also substantially aligned in the position of FIG. 8 in a common plane that is substantially perpendicular to the second axis 5 (i.e., the recess 21 keeps the C-shaped ring 23 from twisting).

Figure 10:
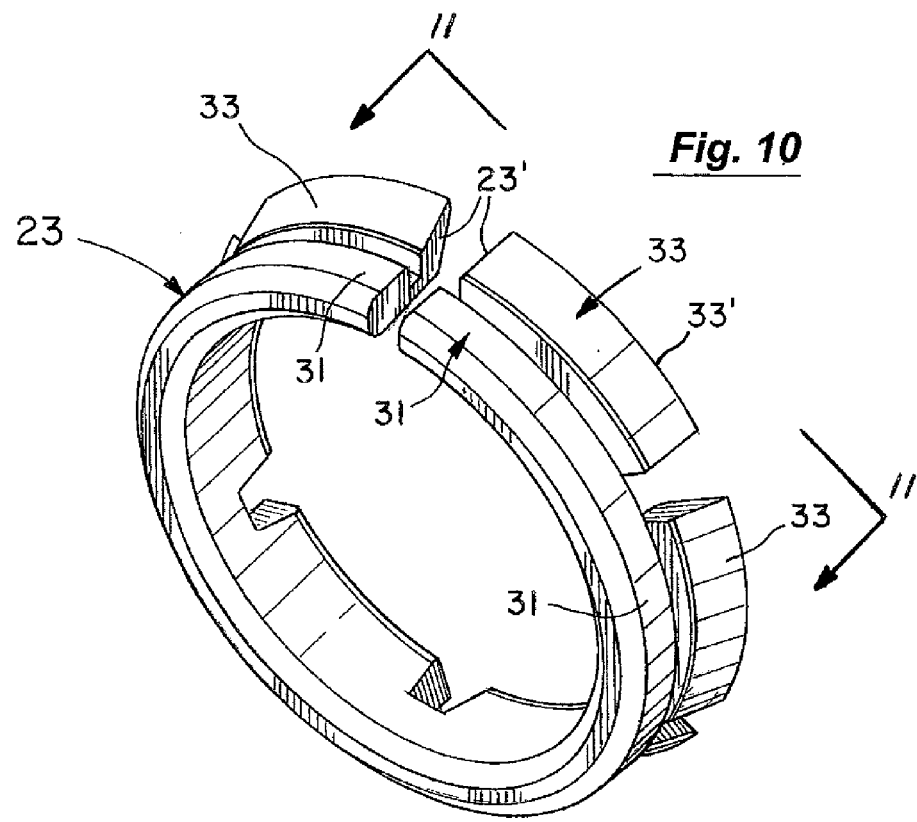
FIG. 10 is a perspective view of the C-shaped ring that grips the pipe.
Figure 11:
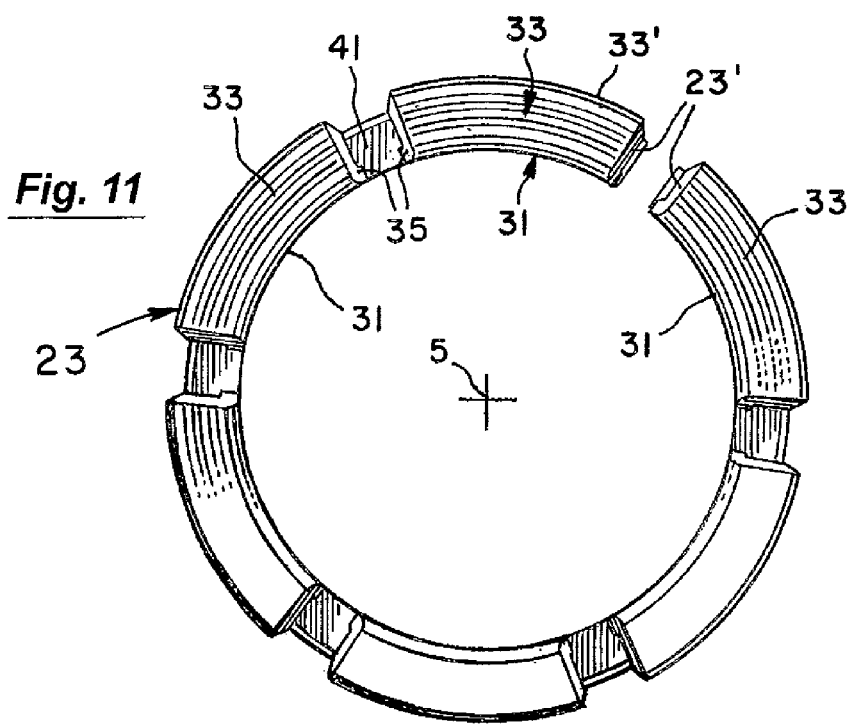
FIG. 11 is a view of the pipe gripping ring taken along line 11-11 of FIG. 10.

The first end segments 31 of each pair of end segments 31,33 are joined to each other about the pipe gripping ring 23 as illustrated in FIGS. 10-11. Adjacent second end segments 33 are then radially spaced from each other about the axis 5 by a gap 41 (e.g., 10 degrees) as seen in FIG. 11. This enables the respective second end segments 33 to pivot about the central pivot segments 35 relative to the respective first end segments 31 as in FIGS. 8-9. In this regard, the number of pairs 31,33 is preferable between about four and 8 with six being more preferred. The arcuate extent of each tip or edge section 33' radially about the axis 5 in FIG. 11 is then about 50 degrees with six pairs. This has been found to provide a desirable balance between the flexibility of each second end segment 33 relative to its first end segment 31 and the combined, arcuate penetration and grip of the tip or edge sections 33' about the axis 5 into pipe wall 6.

It is noted that the fitting 1 of the present invention is described as being a clampless one because it can hold the plastic pipe 2 on the section 3 of the fitting 1 under operating water pressures without a traditional clamp. However, an outer clamp could be used with it if desired. The fitting 1 has also been illustrated as a Tee having three sections but the invention as illustrated between the one section 3 and single plastic pipe 2 could be used in any number of configurations.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims. In particular, it is noted that the word substantially is utilized herein to represent the inherent degree of uncertainty that may be attributed to any quantitative comparison, value, measurement or other representation. This term is also utilized herein to represent the degree by which a quantitative representation may vary from a stated reference without resulting in a change in the basic function of the subject matter involved.

We claim:

1. A fitting (1) for a plastic pipe (2), the plastic pipe being substantially cylindrical about a first axis (4) and having a wall (6) extending along the first axis (4) between outer and inner surfaces (8,10), said plastic pipe (2) further including at least one open end (12), said fitting (1) including at least, one substantially cylindrical section (3) extending along and about a second axis (5) and having outer and inner surfaces (7,9), the outer surface (7) of the one section (3) having a sealing portion (11) and a pipe gripping portion (13) adjacent one another along the second axis (5), said pipe gripping portion (13) including a recess (21) in the outer surface (7) of the one section (3) extending substantially about the second axis (5) and a pipe gripping ring (23) received in said recess (21) and extending substantially about the second axis (5), said recess (21) in the one section (3) having a substantially U-shaped cross section defined by first and second walls (25,27) and a base (29) extending therebetween, said first and second walls (25, 27) being spaced from each other along the second axis (5) and extending outwardly from the base (29) and second axis (5), said second wall (27) having a surface spaced from the first wall (25) and extending away from the base (29) of the recess (21) and the second axis 5, said pipe griping ring (23) received in said recess (21) having first and second end segments (31,33) and a central pivot segment (35) therebetween joining and pivotally mounting the first and second end segments (31,33) to each other, said first end segment (31) being positioned in said recess (21) adjacent the first wall (25) of the recess (21) and said second end segment (33) being positioned in the recess (21) adjacent the second wall (27) of the recess (21), said second end segment (33) of the pipe gripping ring (23) having a surface (37) inclined away from the base (29) of the recess (21) and the second axis (5) at an obtuse angle to the second axis (5), said second end segment (33) of the pipe gripping ring (23) positioned in the recess (21) further having a pipe piercing, tip section (33') extending outwardly of the second axis (5) beyond the outer surface (7) of the one section (3) of the fitting (1), said tip section (33') being formed between the inclined surface (37) of the second end segment (33) and a top surface (39) of the second end segment (33) extending substantially along the second axis (5) wherein the sealing and pipe gripping portions (11,13) of the one section (3) of the fitting (1) are receivable in the plastic pipe (2) through the open end (12) thereof by movement of the one section (3) of the fitting (1) and the plastic pipe (2) toward each other in a first direction to a first location relative to each other, said first and second end segments (31,33) of the pipe gripping ring (23) at said first relative location of the one section (3) of the fitting (1) and the plastic pipe (2) being in a first position spaced from each other along the second axis (5) and wherein movement of the one section (3) of the fitting (1) and the plastic pipe (2) away from each other in a direction opposite to the first direction toward a second location relative to each other will move the pipe piercing, tip section (33') of the second end segment (33) of the pipe gripping ring (23) into the pipe wall (6) through the inner surface (10) of the plastic pipe (2) and pivot the second end segment (33) to a second position about the central pivot segment (35) to abut the first end segment (31) of the pipe gripping ring (23).

2. The fitting of claim 1 wherein the surface of the second wall (27) of the recess (21) is inclined away from the base (29) of the recess (21) at an obtuse angle to the second axis (5).

3. The fitting of claim 2 wherein said the obtuse angle of the inclined surface (37) of the second end segment (33) of the pipe gripping ring (23) and the obtuse angle of the inclined surface of the second wall (27) of the recess (21) at the first relative location of the section (3) of the fitting (1) and plastic pipe (2) are substantially the same.

4. The fitting of claim 3 wherein said obtuse angles are substantially between 105 and 110 degrees.

5. The fitting of claim 2 wherein said first end segment (31) of the pipe gripping ring (23) at the second relative location of the section (3) and plastic pipe (2) abuts the first wall (25) of the recess (21) and the inclined surface (37) of said second end segment (33) abuts the inclined surface of said second wall (27) of the recess (21).

6. The fitting of claim 5 wherein the first end segment (31) of the pipe gripping ring (23) at the first relative location of the section (3) and plastic pipe (2) abuts the first wall (25) of the recess (21) and the inclined surface (37) of said second end segment (33) is spaced from the inclined surface of said second wall (27) of the recess (21).

7. The fitting of claim 1 wherein said first end segment (31) of the pipe gripping ring (23) at the first relative location of the section (3) and plastic pipe (2) abuts the first wall (25) of the recess (21) and the inclined surface (37) of said second end segment (33) abuts the surface of said second wall (27) of the recess (21).

8. The fitting of claim 7 wherein the first end segment (31) of the pipe gripping ring (23) at the second relative location of the section (3) and plastic pipe (2) abuts the first wall (25) of the recess (21) and the inclined surface (37) of said second end segment (33) is spaced from the surface of said second wall (27) of the recess (21).

9. The fitting of claim 1 wherein the inclined surface (37) of the second end segment (33) with the second end segment (33) in said second position abutting the first end segment (31) extends about 90 degrees to said second axis (5).

10. The fitting of claim 1 wherein the inclined surface (37) of the second end segment (33) with the second end segment (33) in said second position abutting the first end segment (31) extends toward the second wall (27) of the recess (21) at an angle less than 90 degrees with said second axis (5).

11. The fitting of claim 1 wherein said central pivot segment (35) joining said first and second end segments (31,33) of the pipe gripping ring (23) is a living hinge and said first and second end segments (31,33) pivot relative to each other about the central pivot segment (35) between said first and second positions relative to each other.

12. The fitting of claim 1 wherein the abutting, second position of the first and second end segments (31,33) is a predetermined position.

13. The fitting of claim 1 wherein said pipe gripping ring (23) is substantially C-shaped about the second axis (5) and has a plurality of pairs of said first and second end segments (31,33) with each pair respectively extending along said second axis (5) and with the second end segment (33) of each adjacent pair (31,33) being spaced from each other about the second axis (5).

14. The fitting of claim 13 wherein the pipe gripping ring (23) has at least four pairs of first and second end segments (31,33) about the second axis (5).

15. The fitting of claim 14 wherein adjacent second end segments (33) about said second axis (5) are spaced about 10 degrees from each other.

16. The fitting of claim 13 wherein the pipe gripping ring (23) has at least six pairs of first and second end segments (31,33) about the second axis (5).

17. The fitting of claim 16 wherein adjacent second end segments (33) about said second axis (5) are spaced about 10 degrees from each other and the tip sections (33') of the respective second end segments (33) respectively extend about 50 degrees about said second axis (5).

18. The fitting of claim 1 wherein the top surface of the second end segment (33) of the pipe gripping ring (23) at the first relative location of the section (3) and plastic pipe (2) includes an inclined portion (39) extending away from the first end segment (31) along the second axis (5) and away from the second axis (5) at an acute angle.

19. The fitting of claim 18 wherein said acute angle is about 15 to 20 degrees.

20. The fitting of claim 18 wherein said first end segment (31) of the pipe gripping ring (23) at the first relative location of the section (3) and plastic pipe (2) has a top surface (31') extending along said second axis (5) adjacent the inner surface (10) of the pipe (2) and the top surface of the second end segment (33) at said first relative location of the section (3) and plastic pipe (2) has a portion (39') spaced from and substantially aligned with the top surface (31') of the first end segment (31).

* * * * *